Dec. 15, 1970 W. L. PRICE 3,548,319

SYNCHRONOUS DIGITAL COUNTER

Filed July 29, 1968 4 Sheets-Sheet 1

WITNESSES:

Bernard R. Gregory

James F. Young

INVENTOR

William L. Price

BY Dean Schron

ATTORNEY

SYNCHRONOUS DIGITAL COUNTER

Filed July 29, 1968 4 Sheets-Sheet 2

SYNCHRONOUS DIGITAL COUNTER

Filed July 29, 1968 4 Sheets-Sheet 3

United States Patent Office 3,548,319

Patented Dec. 15, 1970

3,548,319
SYNCHRONOUS DIGITAL COUNTER

William L. Price, Severna Park, Md., assignor to Westinghouse Electric Corporation, Pittsburgh, Pa., a corporation of Pennsylvania Filed July 29, 1968, Ser. No. 748,261
Int. Cl. H03k *21/00, 29/00*
U.S. Cl. 328—41 10 Claims

ABSTRACT OF THE DISCLOSURE

A synchronous counter comprising a cascaded plurality of variable length groups of counting elements or stages, the individual counting groups of which are operated either synchronously, non-synchronously or a combination of both. The memory element of each counting group may sequence through a variety of memory output combinations; however the groups of counting elements are isolated and controlled by at least one respective synchronizing enable circuit under the control of a master enable circuit.

BACKGROUND OF THE INVENTION

Counters fall into a category of devices known as switching systems. A switching system accepts at each instant of time one of a finite number of input combinations and produces at its output one of a finite number of output combinations according to some desired transformation. Switching systems can be classified into two major categories: combinatorial and sequential. In combinatorial systems, time is not an explicit variable. That is, the output is dependent only on the present input combination. A sequential system consists of two parts: a storage or memory and a combinatorial feedback network. Its output depends not only on the present input but also on the past history stored in the memory. In practice, the inherent time delay through any network must be considered in both the combinatorial and sequential circuits, especially when operating at high frequencies. The memory consist of "K" binary devices, i.e., K bistable elements each of which can store either a "0" or a "1." Thus, the K devices can store a maximum of $2^K$ different combinations. The particular combination of memory outputs is referred to as the state of the system. There are two primary modes of operation of a sequential system: synchronous and non-synchronous.

If all of the memory elements in a sequential system are triggered simultaneously, i.e. in parallel, the system is said to be synchronous. The system is said to be non-synchronous if the memory elements are not triggered simultaneously by a common clock signal. A sequential system may be operated in either of the two primary modes or in a combination of both.

Counters are sequential devices since they contain a memory and a combinatorial feedback network. Counters usually respond to only one external signal, commonly referred to as the "clock" input. The memory in the counter responds to the clock input by stepping through a predetermined sequence of memory output combinations.

Many types of storage devices described by R. K. Richards in Digital Computer Components and Circuits, D. Van Nostrand, Princeton, N.J., 1957, may be used in the design of the memory. However, the two most widely used in counter designs are the R–S and J–K bistable devices, commonly referred to as R–S or J–K flip-flops. The details of the memory design vary slightly due to the specific characteristics of the storage device selected. The characteristics of R–S and J–K storage devices are described in Logical Design of Digital Computers by Montgomery Phister, Jr., John Wyley and Sons, Inc., 1963. Furthermore, high speed binary counters utilizing J–K flip-flops of the ripple, synchronous, and hybrid types are disclosed in a publication entitled "High Speed Binary Counters Greater Than 4-Bits," Application Note No. 11, Application Notes, Sylvania Integrated Circuits, dated Sept. 30, 1966 by J. J. Rienzo. A divider circuit utilizing J–K microelectronic circuit flip-flops is additionally illustrated in U.S. Pat. 3,268,741 granted to J. R. Shea.

The concepts taught by the above-noted art presents the methods employed to design counters with a variety of memory sequences operating in either the synchronous or non-synchronous mode or a hybrid combination of both modes. Each mode of operation provides certain characteristic advantages as well as disadvantages.

Counters employing the synchronous mode will operate with higher frequency clock signals than counters using the other operating modes. However, prior art synchronous counters have stringent requirements on the memory element drive capability and on the logical gating structure of the combinational network. In addition a large amount of clock drive is required since each counting element is operated from a common clock source. For example in the standard straight binary synchronous counter the number of gate inputs to each flip-flop increases as the number of bits or computing elements increases. A four bit synchronous counter commonly requires three inputs in the last flip-flop. A 13-bit synchronous counter would require 12 inputs to the last flip-flop. The first inherent problem is due to the fact that as the counter length is increased the number of inputs to the gate are increased and the propagation time through the gate also increases. A second problem results from the fact that the input into each gate comes from each preceding flip-flop. Hence as the counter length is increased, the loading of each memory device increases. These restrictions limit the implementation of large synchronous counters operating at high frequencies.

In non-synchronous ripple counters the clock signal drives the first counting stage with each subsequent stage being driven in turn by a preceding element. It can be shown that ripple counters sacrifice high operating speed for a less stringent requirement on the memory element drive capability and on the logical gating structure requirement. The hybrid counter consists of a plurality of synchronous counters connected together in a ripple configuration to form a device commonly called semi-synchronous. The semi-synchronous counter offers advantages and disadvantages that fall in between the synchronous and non-synchronous systems.

A system complexity increases, the demands on the basic counting device become more stringent. These demands usually result in three fundamental design goals: higher frequency operation, greater count capability, and an iterative structure to facilitate implementation.

SUMMARY OF THE INVENTION

The present invention is directed to synchronous counters consisting of a plurality of variable length groups of counting elements in which the individual counting groups may be operated either synchronously, non-synchronously or a combination of both. Each counting group consists of a memory, a combinatorial feedback network as well as a synchronizing control or enable circuit. The memory of each counting group sequences through a variety of memory output combinations. A common clock signal is supplied to each group of counting elements and to each synchronizing enable circuit. Excluding the first group, the purpose of each synchronizing enable circuit is to enable its associated group of computing elements to step through its memory sequence in conjunction with the appropriate clock pulses. The first enable circuit, called the master enable, is driven by the first group and synchronizes the subsequent enable circuits to the first group of counting elements.

Stated another way, the invention comprises a cascaded plurality of variable length groups of counting elements isolated by a plurality of synchronizing enable circuits. The invention provides a synchronous counting device exhibiting the characteristics of the first or worst case counting group no matter how many additional groups are cascaded after the first group.

DESCRIPTION OF THE PREFERRED EMBODIMENTS

The present invention is described embodying a straight binary counter. A straight binary counter is comprised of computing elements in which the memory elements sequence through a binary weighted code; that is, the memory elements or bits are weighted 1, 2, 4, 8 . . . $2^{n-1}$, where $2^{n-1}$ corresponds to the weight of the *n*th bit. As stated earlier many bistable devices may be employed as the memory element. One such device is the flip-flop circuit and more particularly the J–K flip-flop manufactured in integrated circuit form. Most integrated circuit J–K flip-flops include three "J" input terminals and three "K" input terminals that provide a three (3) input AND function at the "J" and "K" terminals. The input clock signal is applied to a "C" terminal. Two output terminals are provided: a "Q" terminal that indicates the state of the device and a "$\overline{Q}$" terminal that is the inverse of the "Q" terminal. The flip-flop is said to be in the "set" state or condition when the Q output is at a "1" level and the $\overline{Q}$ is at a "0" level. When the Q and $\overline{Q}$ terminals are at a "0" and "1" level respectively, the flip-flop is said to be in the "reset" state. Flip-flops that switch on the '1" to "0" transition of the clock pulse usually require that input J and K signals remain dormant during the time that the clock pulse is applied, i.e. during the "1" level of the clock signal the J and K input signals are not permitted to switch from one state to another.

The operation of the flip-flop is dependent upon the state of the J and K input signal when the clock pulse is applied. This operation is best described by the following table:

| $J^n$ | $K^n$ | $Q^{n+1}$ |
|---|---|---|
| 0 | 0 | $Q^n$ |
| 1 | 0 | 0 |
| 0 | 1 | 1 |
| 1 | 1 | $\overline{Q}^n$ |

where $J^n$ and $K^n$ corresponds to the state of the J and K input signals just prior to the application of a clock pulse. $Q^n$ and $\overline{Q}^n$ corresponds to the state of the Q and $\overline{Q}$ terminals just prior to the application of the clock pulse. $Q^{n+1}$ represents the state of the Q output after the clock signal has been applied.

Before proceeding to a detailed explanation of a preferred embodiment of the invention, consideration of circuitry illustrative of the present state of the art will be helpful in understanding the subject invention as well as making evident the improvement in synchronous counters provided by the subject invention.

Figure 1:
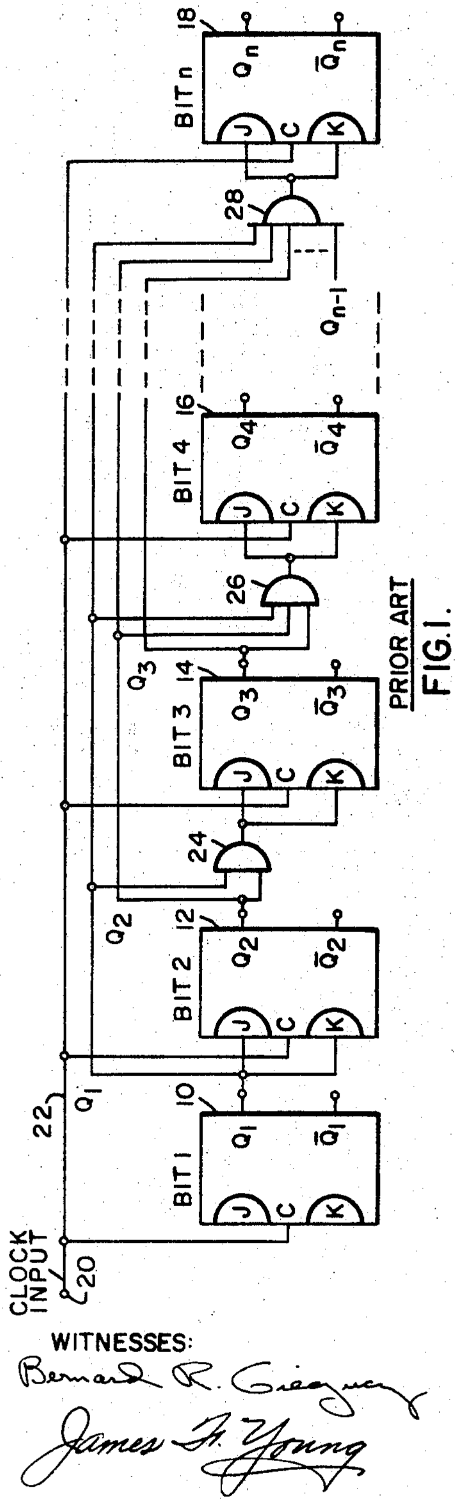
PRIOR ART FIG. 1.
FIG. 1 is a schematic block diagram of a typical synchronous straight binary counter illustrative of the present state of the art.

Referring now to FIG. 1 there is disclosed a standard configuration for a straight binary synchronous counter utilizing an "*n*" number of J–K flip-flops for an *n* bit counter. Reference numeral 10 refers to the first J–K flip-flop for bit No. 1. Accordingly reference numerals 12, 14, 16 and 18 correspond to flip-flops for bits 2, 3, 4 . . . and *n*, respectively. A clock signal from a source not shown is applied to terminal 20 and fed to each C input terminal of flip-flops 10 through 18 by means of a circuit buss 22. The only input applied to the first flip-flop 10 is the clock signal comprised of a series of pulses. The output is taken from $Q_1$ and commonly applied to the J and K inputs of flip-flop 12 and the subsequent input AND gates 24, 26 and 28. In a similar manner, the output $Q_2$ from flip-flop 12 is applied to all succeeding flip-flops 14, 16 and 18 by means of their respective input AND gates including gates 24, 26 and 28. It can be seen that in such a configuration the number of gate inputs to each successive flip-flop increases as the number of "bits" or stages of computing elements in the counter increases.

Figure 2:
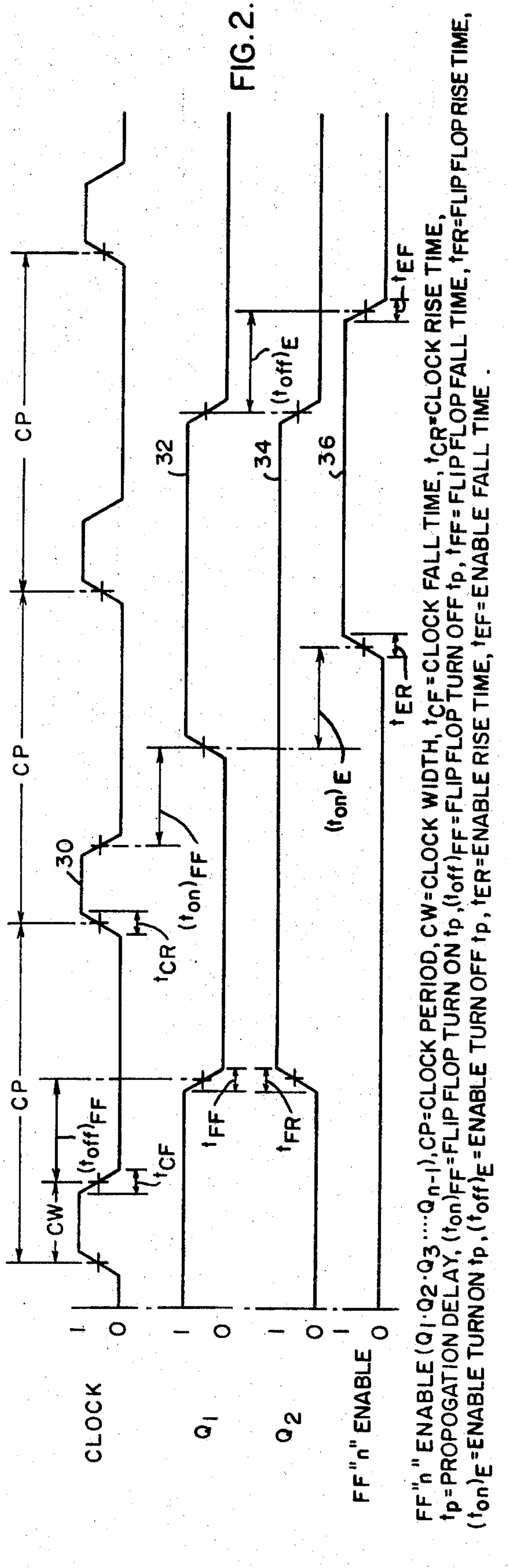
FIG. 2 is an illustrative diagram of waveform generated by the counter shown in FIG. 1.

Consequently, for an *n* bit synchronous counter $n-1$ inputs would be required at the *n*th bit flip-flop. This input requirement results in two basic limitations. First, as the number of inputs to the combinatorial feedback network, i.e., input gate, are increased, for example, input AND gate 28, the propagation delay time through the gate increases. Secondly, since the inputs to each gate come from each preceding memory element or flip-flop, the loading of each flip-flop increases as the counter length is increased. The operation of the configuration shown in FIG. 1 is illustrated by the memory element output waveforms depicted in FIG. 2. The waveforms are typically square waves; however, they have discrete rise and fall times. For purposes of explanation, the waveforms have ben drawn to exhibit these times. Waveform 30 is illustrative of a regularly recurring clock pulse having a clock width CW and a period of CP. The clock width CW must be sufficient to operate a flip-flop plus a tolerance allowed for variation in clock distribution. Waveforms 32 and 34 are illustrative of the outputs $Q_1$ and $Q_2$ of flip-flops 10 and 12, respectively. The circuitry, moreover, operates on edge type switching, i.e. on the down-going slope of the fall time $t_{cf}$ of the clock pulse. This can be seen by reference to waveforms 30 and 32 wherein the output $Q_1$ switches from the "1" state to the "0" state during the fall time $t_{cf}$ of the first clock pulse and that it again changes state on the fall time $t_{cf}$ of the second clock pulse. The memory element of the counter divides the frequency of the output from the previous memory element by a factor of two ($\div 2$) in synchronism with the clock pulse waveform 30. Each flip-flop in the counter requires an enabling signal from its respective combinatorial feedback network, i.e. input AND gate. The enabling gate for the *n*th flip-flop 18 is shown by waveform 36. It has a rise time and fall time identified as $t_{ER}$ and $t_{EF}$, respectively. The waveforms 32 and 34 have respective rise and fall times of $t_{FR}$ and $t_{FF}$.

As stated earlier memory elements that switch on the "1" to "0" transition of the clock pulse usually require that the J and K input signal remain dormant during the time the clock pulse is present. From this requirement the maximum operating frequency of the synchronous counter depicted in FIG. 1 can be expressed by the following relationship when considering the waveforms of FIG. 2:

$$f_{max}=\frac{1}{CP}=\frac{1}{CW+(t_p)_{FF}+(t_p)_E}+(t_p)_A$$

If $(t_{on})_{FF}$ is not equal to $(t_{off})_{FF}$ and $(t_{on})_E$ is not equal to $(t_{off})_E$ then the smaller of the following two expressions must be used as the maximum operating frequency:

$$f_{max}=\frac{1}{CP}=\frac{1}{CW+(t_{on})_{FF}+(t_{on})_E+(t_p)a}$$

$$f_{max}=\frac{1}{CP}=\frac{1}{CW+(t_{off})_{FF}+(t_{off})_E+(t_p)a}$$

where:

CW=clock width required to operate the flip-flop, plus a tolerance allowed for variation in clock distribution.

$(t_{on})_{FF}$=the time required for the set output of the flip-flop to switch from its zero level to a one level. It is measured between the trailing clock edge maximum "0" level to the set output minimum "1" level.

$(t_{off})_{FF}$=the time required for the set output to switch from a "1" level to a "0" level. It is measured between the clock trailing edge maximum "0" level to the set output maximum "0" level.

$(t_p)_{FF}$=term used to refer to either $(t_{on})_{FF}$ or $(t_{off})_{FF}$ or both $(t_{on})_E$=the time required for a non-inverting gating network to switch from a zero to a one after a minimum "1" level appears at the input. It is measured from the input minimum "1" level to the output minimum "1" level.

$(t_{off})_E$=the time required for a non-inverting gating network to switch from a one level to a zero level after a zero level appears at the input. It is measured from the input maximum "0" level to the output maximum "0" level.

$(t_p)_E$=the term used to refer to either $(t_{on})_E$ or $(t_{off})_E$ or both.

$(t_p)_A$=propagation delay resulting from the stray reactance inherent in the counter assembly.

The minimum clock width CW required for correct flip-flop operation is specified by the device manufacturer and is therefore independent of the counter design. The tolerance allowed for variations in the clock distribution is a function of the clock signal generator and driver, the transmission scheme, and the assembly configuration. Since each memory element or bit in any synchronous counter requires a clock input, the value of this tolerance is considered to be independent of the counter configuration. The maximum flip-flop switching time which is the propagation delay $(t_p)_{FF}$ is determined by the device configuration, environment and device loading. For the deviec selected operating in a given environment, reduced flip-flop loading will increase the maximum frequency of operation and facilitate increased count capability. The maximum switching time of the combinatorial feedback network or the propagation delay $(t_p)_E$ is a function of device configuration, environment and "enable" gating design. In most all synchronous binary counters, the enable function E is provided by an AND gate preceding subsequent flip-flops. It should be pointed out, however, that the enable switching delay time increases with the number of gate inputs and the number of gating levels required. The assembly propagation delay time $(t_p)_A$ results from the stray reactance inherent in the assembly. Its value is a function of counter length, the number of connections, the length of the conductors, and the assembly configuration from the counter. If the number and length of connections is minimized for a given counter length and assembly technique, this delay time is reduced to a value near its minimum.

Figure 3:
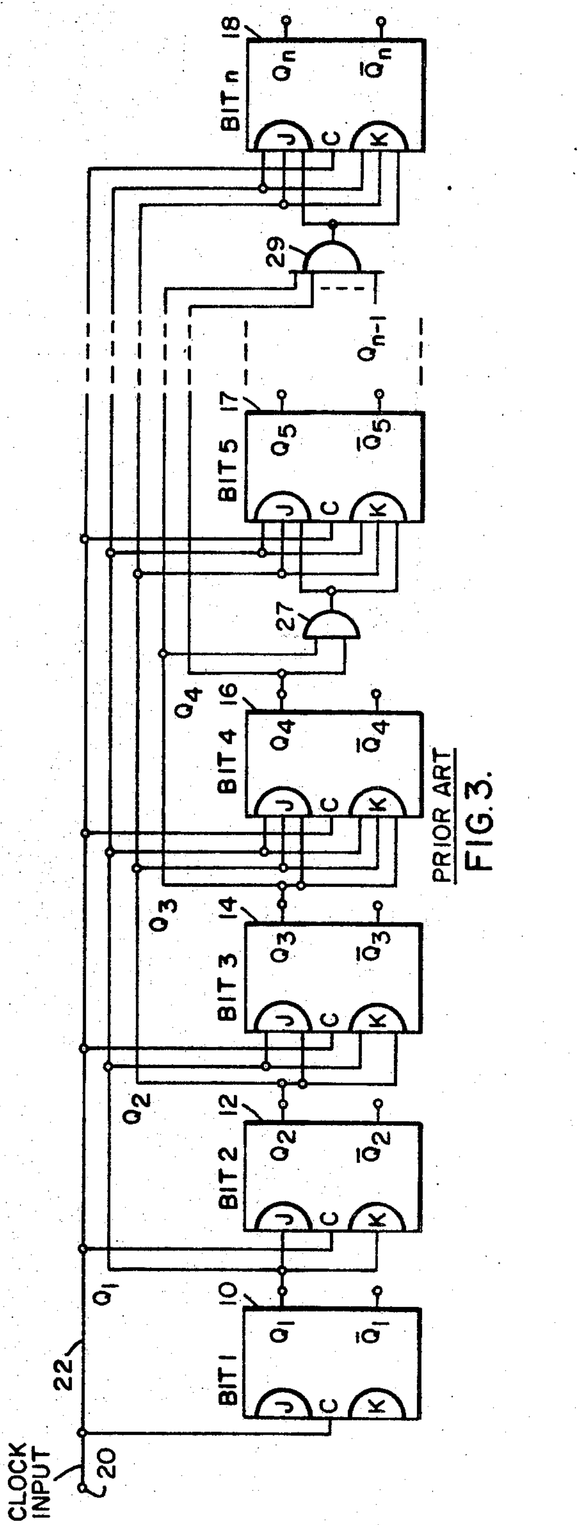
PRIOR ART FIG. 3.
FIG. 3 is a schematic block diagram of a modified synchronous binary counter of the type shown in FIG. 1.

As noted, most all integrated circuit J–K flip-flops provide a three (3) input AND function at each of the J and K inputs. The AND gate switching delay $(t_p)_E$ is included in the flip-flop propagation delay $(t_p)_{FF}$. FIG. 3 discloses a modification of the synchronous counter shown in FIG. 1 utilizing this inherent AND gate feature. It can be seen by referring to FIG. 3 that a synchronous counter with up to four bits or stages can be designed utilizing only flip-flops 10, 12, 14 and 16. No external gating is required to generate the flip-flop enables. This is due to the fact that the fourth flip-flop 16 is adapted to receive inputs of $Q_1$, $Q_2$ and $Q_3$ directly. When the length of the counter exceeds four stages, for example now including the 5th bit flip-flop 17 up to the *n*th flip-flop 18, the enable function is comprised of two gating levels including the direct connection where possible and enabling AND gates, for example, gates 27 and 29.

Figure 4:
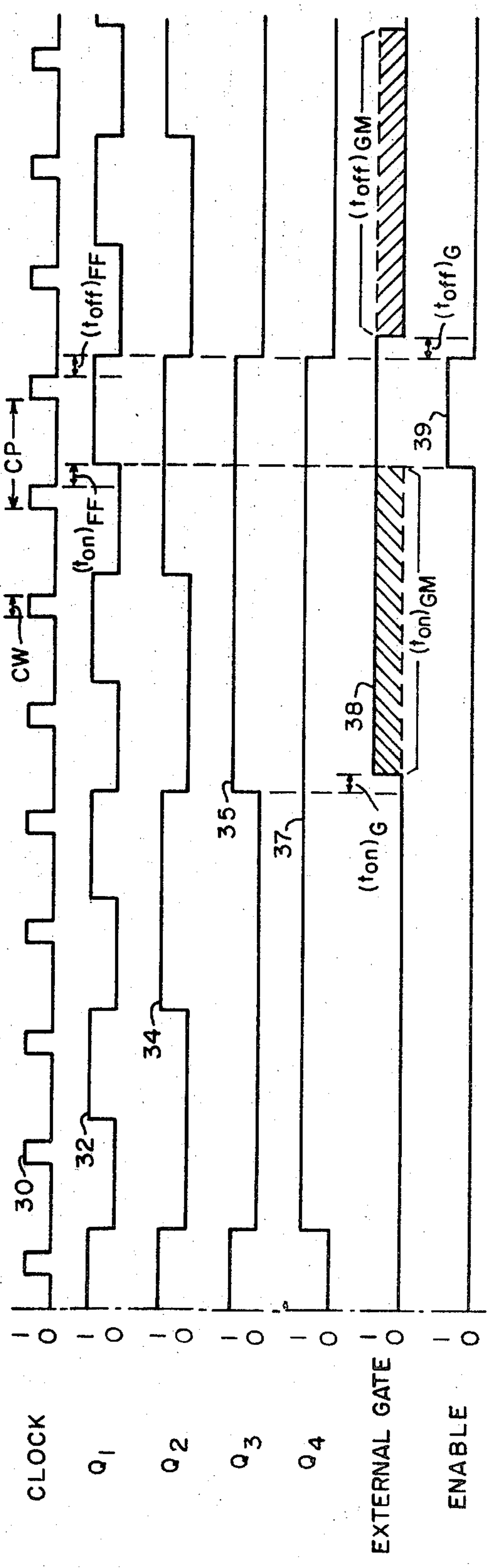
FIG. 4 is an illustrative diagram of waveforms generated by the counter shown in FIG. 3.

When a configuration such as shown in FIG. 3 is utilized, the term $(t_p)_E$ is reduced to zero notwithstanding the fact that some external enable gating is required. This results from the fact that AND gates 27 and 29 now act as a DC qualifier. In such a circuit an output signal that is in the "1" state prior to the critical timing pulses returns to "0" after the critical timing has passed. Referring now to FIG. 4 the clock pulse 30 and the outputs $Q_1$ and $Q_2$ illustrated by waveforms 32 and 34 additionally now include output waveforms 35 and 37 representative of the outputs $Q_3$ and $Q_4$. The external gate from the AND gate 27 is illustrated by waveform 38. It can be seen that the waveform 38 is in its "1" state when the waveforms 35 and 37 are in their respective "1" states. The enabling function is illustrated by waveform 39 and is in its "1" state only when waveforms 32, 34 and 38 representative of the outputs $Q_1$, $Q_2$, and the external gate are in their "1" state. The DC qualifier function exists due to the fact that the external gate waveform 38 may switch to a "1" anytime during the period $(t_{on})_{GM}$ and switched off to "0" anytime during the period $(t_{off})_{GM}$ without causing a counting mulfunction. This DC qualifier gating may be single level as shown or multilevel as long as the propagation delay time $(t_p)_G$ is less than $(t_{on})_{GM}$ and/or $(t_{off})_{GM}$.

The maximum operating frequency for the counter configuration shown in FIG. 3 is independent of the DC qualifier gating and can be expressed as:

$$f_{max}=\frac{1}{CW+(t_p)_{FF}+(t_p)_A}$$

The modified synchronous counter shown in FIG. 3 is inherently faster than the counter shown in FIG. 1 since the term $(t_p)_E$ has been eliminated by utilizing the internal three input AND gates available in the J–K flip-flop to provide the enable gate in synchronism with the counting elements. Moreover, multilevel gating, e.g. a DC qualifier, can be used to generate a large part of the enable function without affecting the maximum operating frequency. There remains, however, the limtation on the practical length of the counter in terms of the number of bits capable of being incorporated. This is because the enable consists of the AND function of all preceding flip-flop "1" outputs and still requires direct connections from all the previous counting elements. The following problems additionally continue to provide a deleterious effect on the implementation of long counters: (1) flip-flop loading increases with counter length; and (2) flip-flop propagation time $(t_p)_{FF}$ will increase with counter length. Since each flip-flop output must connect to all enables for the high order counting stages, a large number of connections remain the lengths of which may be comparatively long and, therefore, the term $(t_p)_A$ is not significantly reduced.

Figure 5:
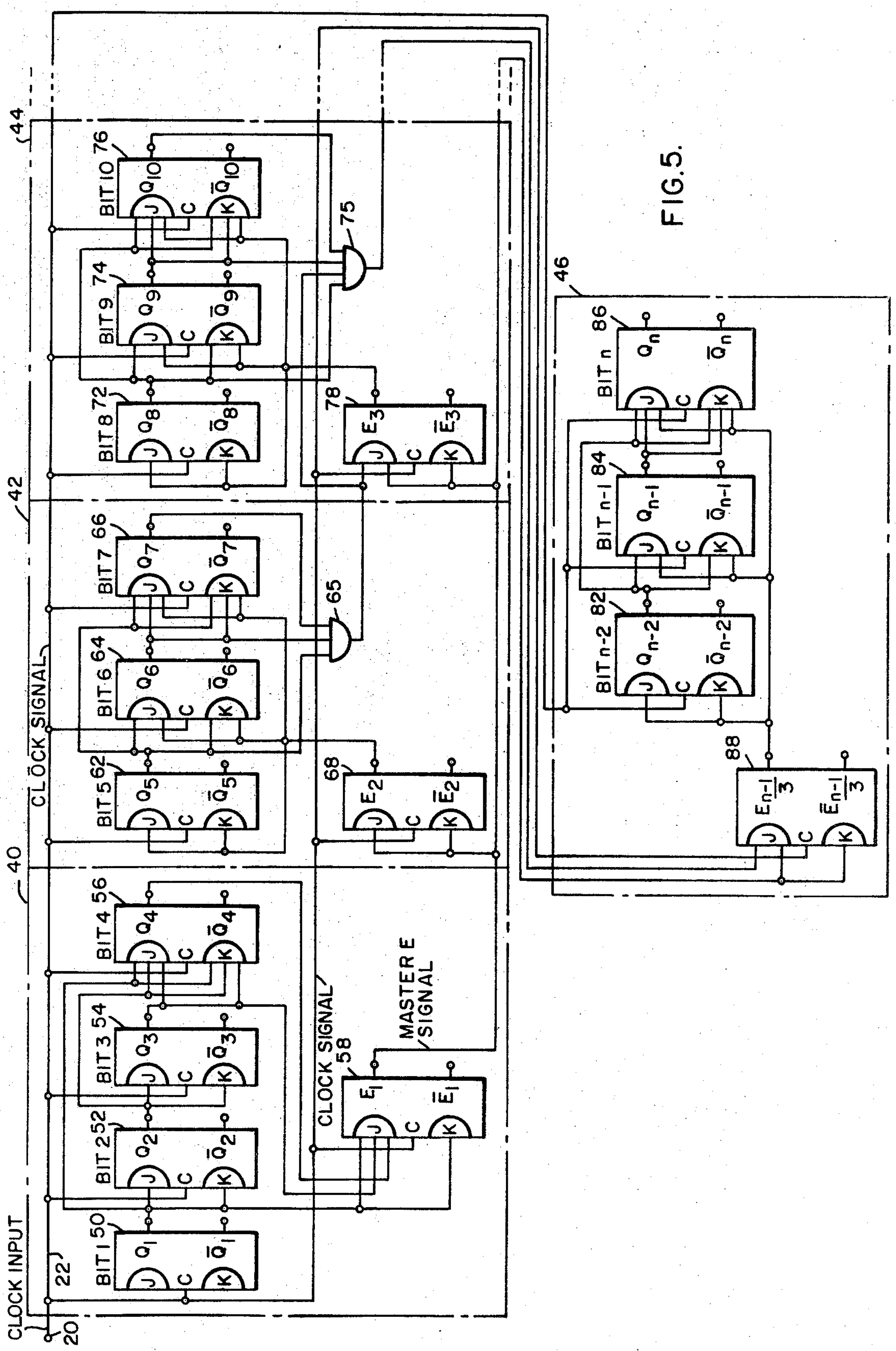
FIG. 5 is a schematic block diagram of the preferred embodiment of the present invention for a straight binary counter.

In view of the foregoing considerations of the limitations imposed on the prior art, consideration is now directed to the subject invention and the preferred embodiment of which is disclosed in FIG. 5.

The subject invention is comprised of a plurality of binary counting groups or sets wherein each set contains a like number of computing elements or stages except for the first set which has one additional computing element. A synchronizing control circuit is coupled to each set of computing elements wherein each control circuit with the exception of the first provides a control or enabling input to its respective set of computing elements. The first control or enabling circuit is controlled by the first set of computing elements to provide a signal that synchronizes the subsequent control or enabling circuits with the first group of counting elements.

More particularly the preferred embodiment shown in FIG. 5 is comprised of a first module 40 including a first set of computing elements 50, 52, 54 and 56 and an associated enabling circuit 58. Following the first module 40 is a plurality of identical modules 42 and 44 and an *n*th module 46. The first set of computing elements 50, 52, 54 and 56 is comprised of four J–K flip-flop circuits coupled together as a four bit synchronous binary counter of the conventional type where the internal AND function is provided internally at both the J and K inputs. The clock signal is applied simultaneously to all of the C inputs by means of the clock circuit buss 22. The master enable $E_1$ J–K flip-flop 58 is coupled to the clock signal by its C input and receives three inputs of $Q_1$, $Q_3$ and $Q_4$ at its J input. The K input receives a signal $Q_1$ from the first flip-flops 50. The master enable circuit 58 couples its $E_1$ output simultaneously to all succeeding enable circuits 68, 78 . . . and 88 at their respective J–K inputs. All succeeding modules 42, 44 and 46 include an identical number (3) of computing elements. For example set 42 is comprised, inter alia, of J–K flip-flops 62, 64, and 66; set 44 includes J–K flip-flops 72, 74 and 76; and the last or *n*th module 46 includes J–K flip-flops 82, 84 and 86.

Each of the computing elements (J–K flip-flops) in a set, for example, flip-flop 62, 64 and 66 receive a respective common enable signal $E_2$ at their J and K inputs. Additionally, a DC qualifier gate $G_1$ comprising AND gate 65 receives inputs of $Q_5$, $Q_6$ and $Q_7$ and couples its output to the J input of the succeeding enable circuit 78 and the next DC qualifier gate $G_2$ comprising AND gate 75 in the next module 44.

Figure 6A:
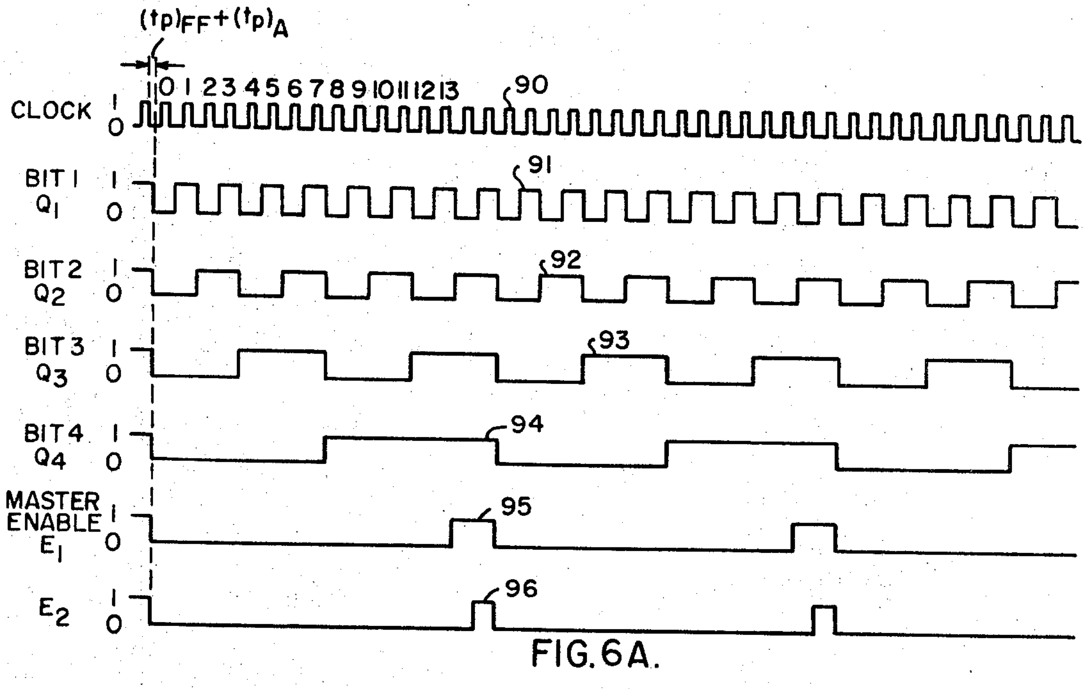
FIGS. 6A through 6C are illustrative diagrams of waveforms generated by this embodiment of the present invention shown in FIG. 5.
Figure 6B:
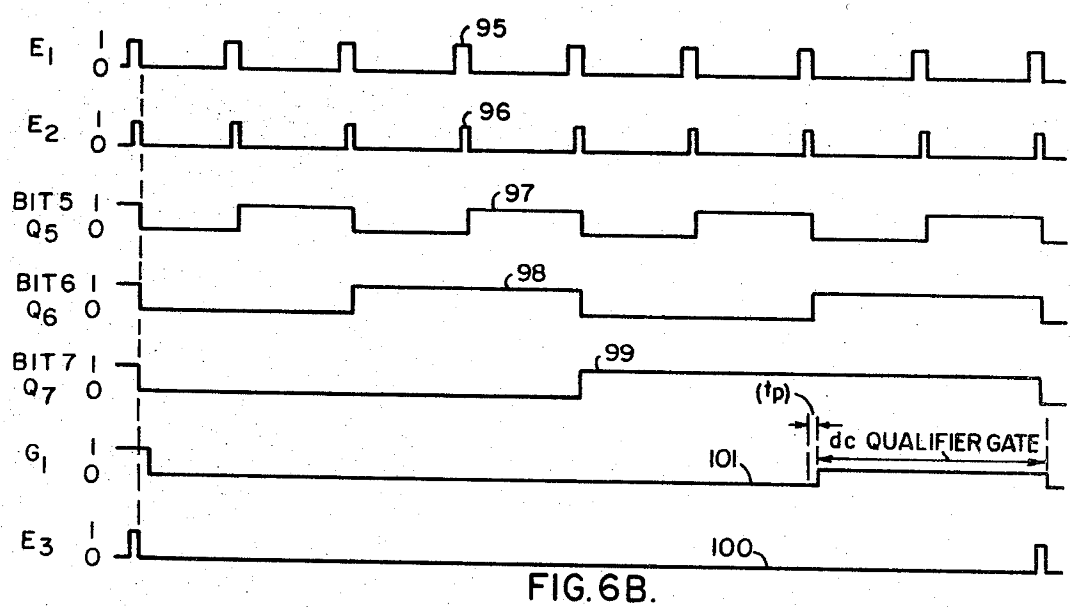
Figure 6C:
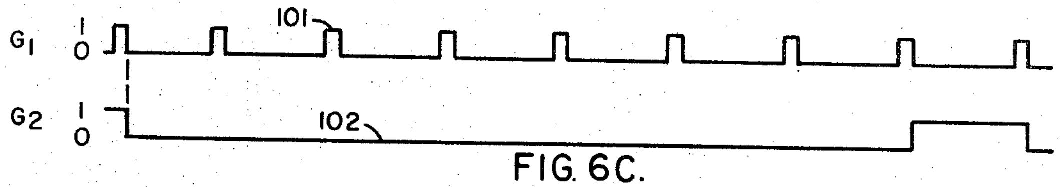

The following explanation of the operation of the subject invention should be considered in conjunction with FIGS. 6A, 6B and 6C; however, it should be pointed out that the waveforms in FIGS. 6B and 6C are compressed in time relative to FIG. 6A due to the limitation of the illustrated time scale and in an attempt to provide a readily discernible sequence of events. FIG. 6 discloses typical waveforms existing in the first module 22 as well as the enable circuit 68. The clock signal is illustrated by waveform 90 while the outputs $Q_1$, $Q_2$, $Q_3$ and $Q_4$ of the J–K flip-flops 50, 52, 54 and 56 are illustrated by waveforms 91, 92, 93 and 94. The master enable signal $E_1$ is illustrated by waveform 95. The output $E_2$ of the second enable circuit 68 is illustrated by waveform 96.

FIG. 6B is illustrative of the waveforms present in the second set of computing J–K flip-flops providing the outputs $Q_5$, $Q_6$ and $Q_7$, respectively. These waveforms are designated by reference numerals 97, 98 and 99. The enable gate signal $E_2$ of the next enable circuit flip-flop 78 is designated by waveform 100 while the DC qualifier gate 65 output $G_1$ is illustrated by waveform 101. The time compression of FIG. 6B can readily be seen by comparing the waveforms 95 and 96 to those in FIG. 6A. Finally the FIG. 6C includes the waveforms 101 and 102 which are illustrative of the DC qualifier gates $G_1$ and $G_2$ from the modules 42 and 44, respectively.

The present invention departs from standard practice by the manner in which the consecutive sets of computing elements are enabled by its respective enabling circuit under the control of the master enabling circuit $E_1$. The master enable flip-flop 58 is synchronously controlled by the clock input applied to its C terminal 20 and the outputs $Q_1$, $Q_3$ and $Q_4$ of the first set of computing elements including the group of bits 1, 2, 3 and 4. The master enable flip-flop 58 is set at count 13 of the clock waveform 90 and reset at count 15 in synchronism with the first four bits (waveforms 91, 92, 93, 94) of the counter. The $E_1$ output (waveform 95) is therefore high i.e. in its "1" state every 14th and 15th clock pulses. This output $E_1$ is fed directly to the J and K inputs of all succeeding enable circuits $E_2$, $E_3$, and $$\frac{E_{n-1}}{3}$$

comprising flip-flops 68, 78 and 88. The output $E_2$ (waveform 96) is "one" every 15th clock pulse time, and provides the enabling signal to the J–K flip-flops 62, 64 and 66 in the second module 42. Since switching occurs on the fall time of the clock pulse the second module 42 computing elements is set (triggered) every 16th clock period in synchronism with the first set of computing elements (flip-flops 50, 52, 54 and 56) and the master enable flip-flop 58 controlled thereby.

When flip-flops 62, 64 and 66 corresponding to bits 5, 6 and 7 have their outputs (waveforms 97, 98 and 99) in the "1" state the output $G_1$ (waveform 101) is a "1." The signal $G_1$ is applied to the J input of the third enable flip-flop 78 and is "anded" with the master enable signal $E_1$. The third enable flip-flop 78 provides an output $E_3$ every 127th clock pulse and resets at every 128th clock pulse time. The output $E_3$ (waveform 100) is then applied as an enabling signal simultaneously to the flip-flops 72, 74 and 76 corresponding to bits 8, 9 and 10 in the third module 44 and is triggered by every 128th clock pulse in synchronism with the first and second sets of flip-flops corresponding to bits 1 through 7.

When flip-flops 72, 74 and 76 corresponding to bits 8, 9 and 10 have their respective Q outputs in their "1" state as well as the signal $G_1$, the output of the second DC qualifier $G_2$ AND gate 75 will be in its "one" state (waveform 102). If the nth module is the fourth module, then there are 13 bits in the counter and the enable flip-flop 88 corresponding to $$\frac{E_{n-1}}{3}$$

is the fourth enable circuit. The enable output $$\frac{E_{n-1}}{3}$$

then is set every 1,023rd clock time and reset at every 1,024th clock time and provides a clock enable signal for the flip-flops 82, 84 and 86 which are therefore triggered by every 1,024th clock pulse in synchronism with bits 1 through 10.

It can be readily seen that the length of the synchronous counter comprising the present invention can be of any desired length since each set of computing elements is of a selected small number, being enabled by its respective enable circuit in synchronism with a master enable circuit. The maximum frequency of operation can be expressed as:

$$f_{\max}=\frac{1}{CW+(t_p)_{FF}+(t_p)_A}$$

The propagation delay term $(t_p)_{FF}$ in the embodiment shown in FIG. 5 is due only to the internal delay of one flip-flop since all flip-flops are triggered in synchronism with a common clock signal. All succeeding enabling circuits $E_2$ through $E(n-1/3)$ comprising flip-flops 68, 78 and 88 provide a "look ahead" enabling feature.

The counter is composed of modular groupings which are isolated from each other so that the loading on each of the counting elements does not increase as the counter length is increased. Also a large number of gate inputs are not required and the use of multilevel DC qualifier gating is permitted without affecting the maximum operating frequency. Additionally, the modular design significantly reduces the number and length of interconnections between the counting elements thereby reducing the term $(t_p)_A$, which is the propagation delay to the stray reactance.

What has been provided, therefore, is a multistage high frequency synchronous binary counter which overcomes the three basic problems of flip-flop loading, gate size and enable propagation delay which have been the primary limitation to long, high speed counters.

While there has been shown and described what is at present considered to be the preferred embodiment of the invention, modifications thereto will readily occur to those skilled in the art. It is not desired, therefore, that the invention be limited to the specific arrangement shown and described, but it is to be understood that all equivalents, alterations, and modifications within the spirit and scope of the present invention are meant to be included.

I claim as my invention:

1. A synchronous digital counter operated by a clock input signal comprising in combination:
   - a plurality of counting elements coupled together in a plurality of variable length sequential groups or sets operating in a predetermined code including means for having said clock input signal simultaneously applied to said groups;
   - a control circuit respectively coupled to each group of counting elements of said pluality of groups including means for having said clock input signal simultaneously applied thereto;
   - first circuit means coupling selective outputs of the first group of said plurality of counting elements to the input of the first control circuit for controlling the operation thereof;
   - second circuit means coupling the output of said first control circuit simultaneously to the input of all succeeding control circuits, said first control circuit being operable to control the operation of all said succeeding control circuits thereby;
   - third circuit means coupling the output of each said succeeding control circuit simultaneously to the input of at least the first counting element in the respective group of counting elements to which it is coupled;

- and fourth circuit means selectively gating the outputs of all the counting elements of selected groups to the respective succeeding control circuit.

2. The invention as defined by claim 1 wherein said counting elements are comprised of bistable devices.

3. The invention as defined by claim 1 wherein plurality of control circuits are comprised of enabling circuits.

4. The invention as defined by claim 2 wherein said bistable circuits are comprised of flip-flop circuits.

5. The invention as defined by claim 2 wherein said bistable circuits are comprised of J–K flip-flop circuits.

6. The invention as defined by claim 1 wherein said plurality of groups of counting elements comprises at least two groups of counting elements and wherein said first group comprises a greater number of counting elements than said second group.

7. The invention as defined by claim 6 wherein said first set of counting elements comprises at least four counting elements and wherein said second set of binary counting elements is comprised of at least three binary counting elements.

8. The invention as defined by claim 7 wherein the output of the first, third and fourth counting elements are coupled to the input of said first control circuit.

9. The invention as defined by claim 8 wherein said first, third and fourth counting elements and said first control circuit are comprised of flip-flop circuits.

10. The invention as defined by claim 9 wherein said flip-flop circuits are comprised of J–K flip-flop circuits.

References Cited

UNITED STATES PATENTS

| | | | |
|---|---|---|---|
| 3,401,343 | 9/1968 | O'Lear | 328—41 |
| 3,420,990 | 1/1969 | Andrea et al. | 307—220X |
| 3,458,825 | 7/1969 | Lagemann | 328—206 |

STANLEY D. MILLER, Primary Examiner

U.S. Cl. X.R.

307—220, 224, 225; 328—42, 49